(No Model.) 3 Sheets—Sheet 1.
E. E. WHIPPLE.
HARROW.
No. 604,343. Patented May 17, 1898.
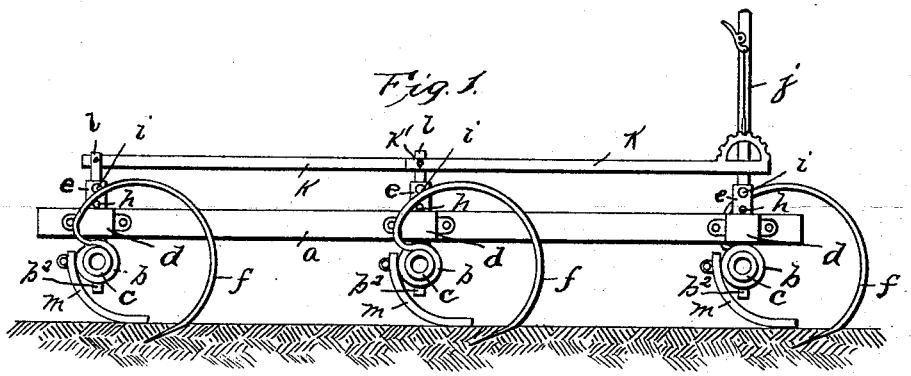
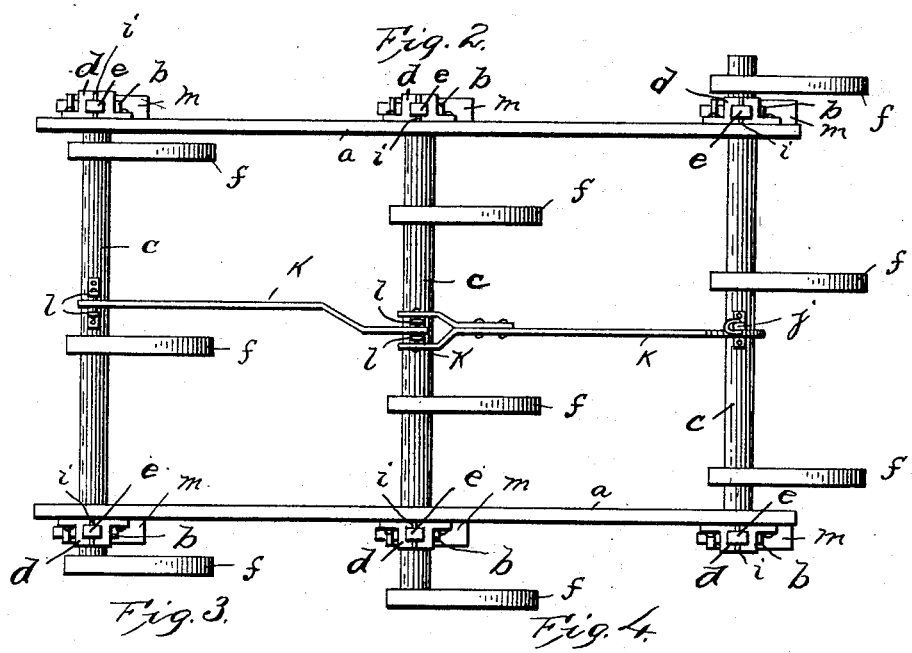
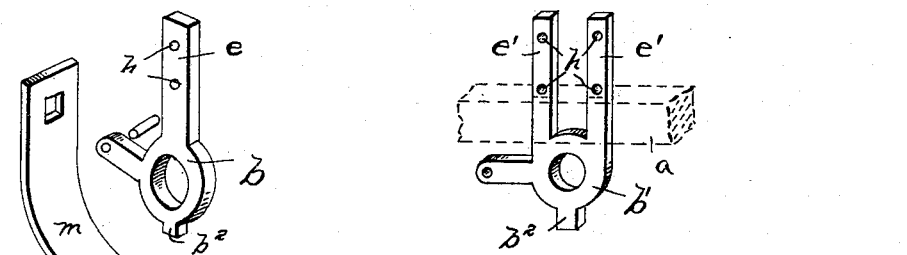
Witnesses
E. C. Duffy
Hubert E. Bok
Inventor
E. E. Whipple
per C. E. Duffy
Attorney
THE NORRIS PETERS CO., PHOTO-LITHO., WASHINGTON, D. C.

(No Model.) 3 Sheets—Sheet 2.

E. E. WHIPPLE.
HARROW.

No. 604,343. Patented May 17, 1898.

Witnesses
E. C. Duffy
Hubert E. Beck

Inventor
E. E. Whipple
per C. E. Duffy
Attorney (No Model.)  E. E. WHIPPLE.  3 Sheets—Sheet 3.
HARROW.
No. 604,343.  Patented May 17, 1898.

UNITED STATES PATENT OFFICE.

EFFINGER E. WHIPPLE, OF ST. JOHN'S, MICHIGAN.

HARROW.

SPECIFICATION forming part of Letters Patent No. 604,343, dated May 17, 1898.

Application filed February 25, 1895. Serial No. 539,711. (No model.)

*To all whom it may concern:*

Be it known that I, EFFINGER E. WHIPPLE, of St. John's, in the county of Clinton and State of Michigan, have invented certain new and useful Improvements in Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in harrows and equivalent agricultural implements.

The object of this invention is to provide certain improvements in details of construction and arrangements and combinations of parts, whether or not the individual tooth-beams rise and fall independently, whereby an exceedingly efficient and advantageous tool will be produced; and a different object of the invention is to provide an improved tooth-fastening simple, durable, and advantageous in construction.

The invention consists in certain novel features of construction and in combinations of parts more fully described hereinafter and particularly pointed out in the claims.

Figure 5:
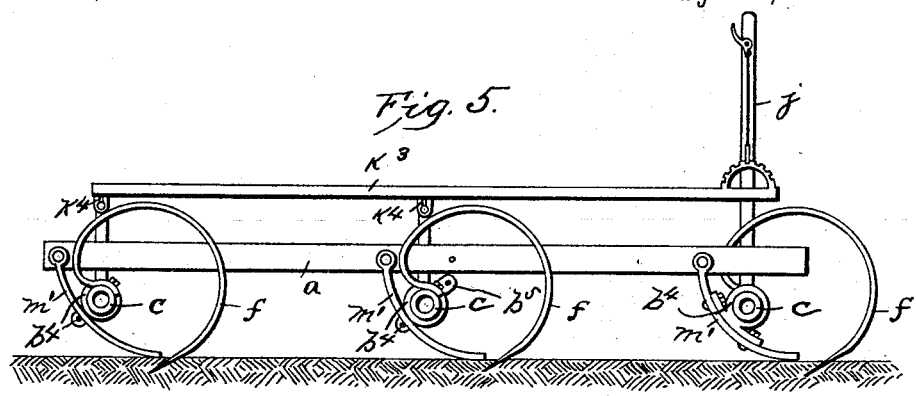
Figure 6:
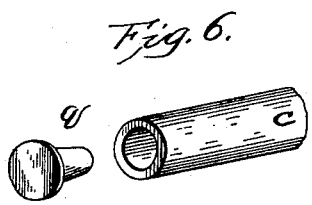
Figure 7:
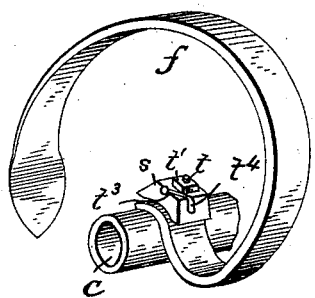
Figure 8:
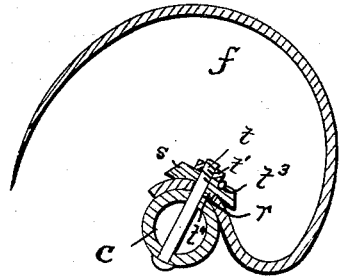
Figure 9:
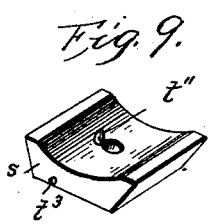
Figure 10:
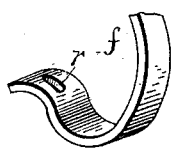
Figure 11:
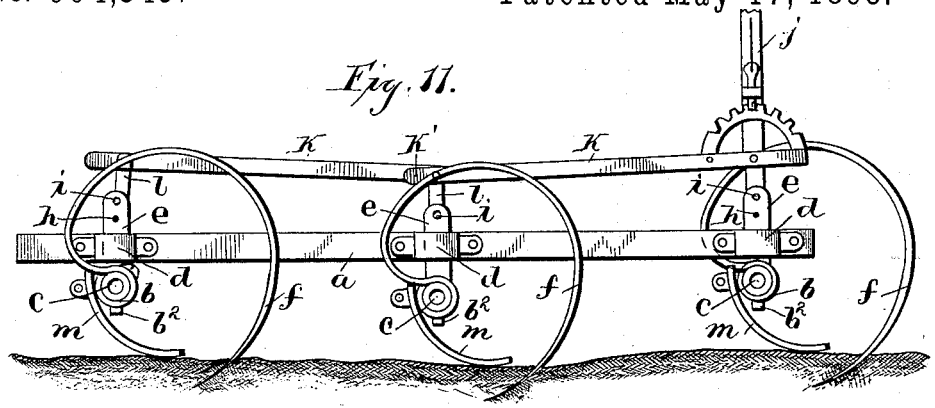
Figure 12:
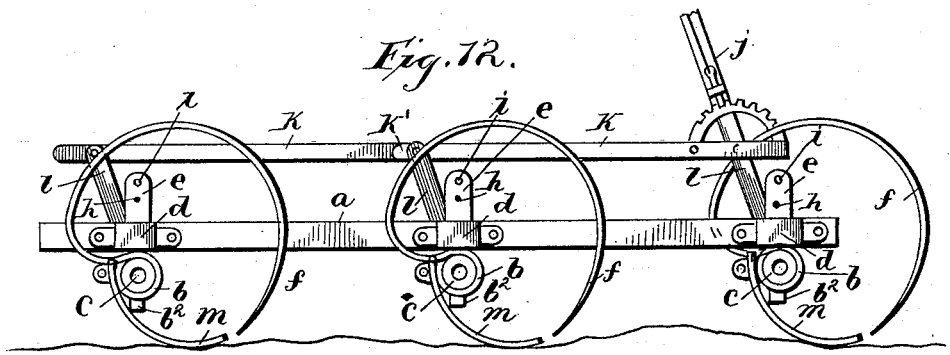
Figure 13:
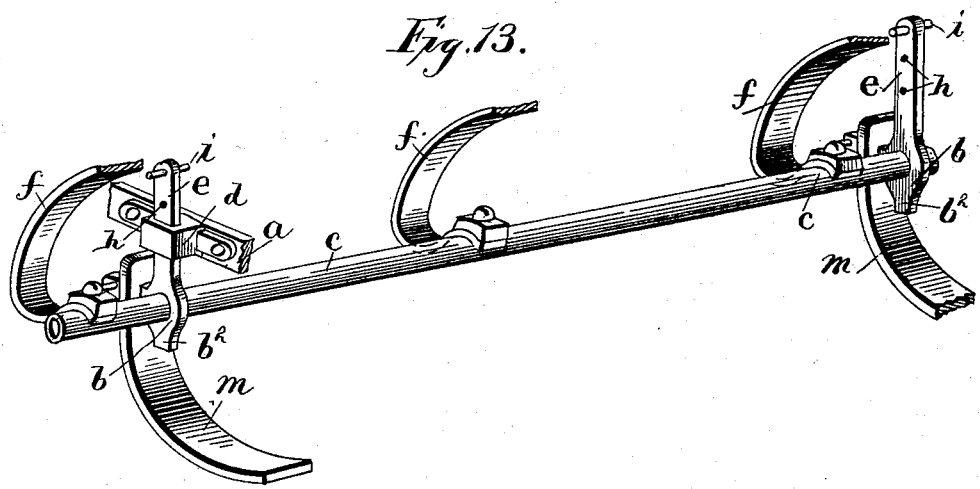

Referring to the accompanying drawings, Figure 1 is a side elevation of the improved harrow. Fig. 2 is a top plan. Fig. 3 is a detail perspective view of a standard, shoe, and fastening-pin. Fig. 4 is a detail view of a different form of support passing through a beam. Fig. 5 is a side elevation of a modified construction embodying my invention. Fig. 6 is a detail perspective of one end of a pipe tooth-beam and a plug to close the same. Fig. 7 is a detail perspective of a portion of a tooth-beam and a tooth, showing the improved fastening. Fig. 8 is a cross-section through the beam, washer, tooth, &c. Fig. 9 is a detail perspective of the locking-washer. Fig. 10 is a detail perspective of the fastened end of a tooth, showing the slot therein. Fig. 11 is a side elevation of a harrow of the same construction as shown in Fig. 1, the teeth being shown in operative position and the center tooth-beam dropped below the level of the remaining tooth-bars. Fig. 12 is a side elevation thereof with the teeth raised out of operative position and the harrow supported on the shoes. Fig. 13 is a detail perspective view of a tooth-bar, showing portions of teeth thereon, the end shoes and standards, and a portion of one frame-bar.

The implement shown comprises the two side bars $a$, formed at their front ends for attachment of the draft at suitable intervals throughout their lengths. These bars are shown in Figs. 1 and 2 as provided with the vertical boxes $d$—usually three boxes—at the front and rear ends and in the middle of each bar. Each box consists of a metal casing having side ears, whereby the box can be secured to the side of the frame-bar and form a vertical opening or bearing.

$c$ are the tooth-beams, arranged transversely in the frame and usually each composed of a straight section of pipe. At its ends each beam is mounted to turn in bearings $b$, forming the lower ends of standards $e$. Each standard fits snugly in one of said boxes $d$ and is of such length as to extend a distance above the same and so formed as to slide vertically and freely therein. Each standard can be formed integral, if so desired, with its lower round bearing-ring in which the tooth-beam turns.

$f$ are the spring harrow-teeth, secured to the tooth-beams, three tooth-beams being here shown on each beam.

The ends of the tooth-beams preferably project through and beyond bearings $b$, so that teeth or other devices can be secured on the outer ends thereof as desired. The upper ends of the standards above their boxes have usually two or more transverse apertures $h\ h$ to receive pins $i$. The lower hole is so arranged that when the pin $i$ is passed therethrough the bearings $b$ will be held up against the lower end of the box and the standard will have no vertical movement in the box. The upper holes are so arranged that when the pin $i$ is in one of them the standard will have a limited vertical play in the box, and consequently the teeth-beam and teeth can play vertically according to the surface of the ground. It will be observed in this connection that each tooth-beam, with its teeth, has a vertical play independent of the other beams, so that while one beam is moving up the others may be moving down, &c.

In Fig. 4 instead of a single standard working through a box secured on the frame-bar the bearing $b'$ is provided with two parallel vertical perforated standards $e'$ $e'$, passing up through holes formed vertically through the frame-bar. The movement of each bearing is controlled by suitable means, as by pins passed through the upper ends of the standards, as before described.

The rear tooth-beam has the upwardly-extending lever $j$, pivoted to the adjusting-bar $k$, which extends forwardly over the other beams and is loosely connected to each by arms $l$, pivoted to the bar and rigid with the tooth-beams. The adjusting-bar has a rack to lock the bar and tooth-beams in connection with the pawl and hand-clip of the lever. It is obvious that this device is to rock the tooth-beams to throw the teeth into and out of working positions and to lock them in the desired adjustments. Now in order to permit free independent vertical play of the various tooth-beams this adjusting-bar has a jointed center connection $k'$ with the center or intermediate tooth-beam arm $l$. Any suitable loose connection can be made between this locking and adjusting bar and the tooth-beams.

In Fig. 5, for instance, the bar $k^3$ is not jointed, but has the vertical slots $k^4$, by means of which the vertical arms of the tooth-beams can be loosely joined to the lock-bar to permit vertical independent play thereof.

$m$ are shoes secured to the standards and extending downwardly and rearwardly therefrom to support the harrow when being transported with the teeth raised from the ground. These shoes at their front upper ends are preferably secured by means of ears, bolts, or other means to the front edges of the bearings of the standards, so that the shoes extend rearwardly beneath these bearings. Each bearing preferably has an ear on its front side passed through a slot in the upper part of the shoe, and then a key is passed through the outer end of the ear to lock the shoe. Also the under side of each bearing preferably has a downwardly-projecting lug $b^2$ resting on the shoe to support and brace the same.

Particular advantages are attained by securing the shoes to the bearings for the rockable tooth-beams, whether but four shoes be used at the corners or whether the shoes be employed on every beam in a harrow having vertically-movable beams, as in the present instance.

It should be noticed that every beam has its own shoe or shoes, preferably two end shoes, and hence each beam is independently supported and movable.

In the construction of Fig. 5 the tooth-beams are independently vertically movable, and each has its end vertically-movable bearings provided with a shoe. In this figure, however, each shoe $m'$ is slotted at its upper end and embraces and is pivoted to the frame-bar, so that its rear end extends downwardly and rearwardly and swings vertically. Each shoe has a bearing $b^4$, rigid on its upper side between its ends, to receive the tooth-beams. Various bearings can be employed, as shown in this figure. It will thus be seen that the tooth-beams and their teeth and shoes move independently of the other beams to follow the surface of the ground.

If desired, each bearing can have an ear $b^5$, projecting from its upper side, that can be bolted to the frame-bar to hold the beam rigid. (See center bearing of Fig. 5.)

Where pipe tooth-beams are employed in light sandy soil and a light harrow is needed, the soil, &c., works into these pipes, which gradually fill up until the extra weight makes the harrow too heavy. Also in some very heavy clay soils the pipe-frame harrow is too light to properly work such heavy soil. To avoid these difficulties, the tapered plugs $q$ are provided, having flanged ends, so that the plugs can be driven in and close the beam ends when desired to keep them empty or when they have been filled with dirt or other substance to increase the weight of the harrow. These plugs can be easily driven in or removed from the beam ends when desired.

Figs. 7, 8, 9, and 10 disclose the peculiar simple tooth fastening and adjusting means. Each spring-tooth has its inner end bent, curved, or concaved to fit down on the upper side of the tooth-beam and from thence curves upwardly and rearwardly over the beam and downwardly to the ground. The portion of the tooth fitting the beam has an elongated longitudinal slot $r$. $s$ is a block or washer concaved on its under surface to fit the upper surface of the portion of the tooth on the beam and having the bolt-hole to register with said slot $r$ and the bolt-hole through the beam. $t$ is the clamping-bolt, passing up through said beam, slot, and washer and provided with the nut $t'$ on its upper end screwed down tightly on the washer. The washer has a teat $t''$ on its under side at one side of the bolt-hole to fit one end of said slot and of such size as to fill the remaining portion of the slot left unoccupied by the bolt—i. e., the bolt and teat fill the slot. The upper face of the washer has a diagonal undercut groove $t^3$ extending thereacross and opening through the sides of the washer and so arranged that when a nail or pin $t^4$ is driven through the groove or way and turned down after the nut has been screwed up the nut will be locked thereby against turning. A most cheap, simple, and positive and effective lock is thus provided. The point of the tooth can be raised and lowered by turning the washer so that its teat fits in opposite ends of the slot, thereby shifting the entire tooth back or forward, which raises the point of the tooth up or down about in a harrow of the ordinary dimensions an inch and a half. Thus to raise the point of the tooth loosen the parts and raise washer and press the tooth forward, so that the bolt fills the back end of the slot, and then place the teat in the front end of the slot and lock parts. The reverse position lowers the point. The tooth and parts are rigidly locked by this formation and construction, which can be applied to any curved or spring tooth implement.

The tooth is formed of spring-steel and is provided with reversed curves. The enlarged bowed portion formed by the curve in the body portion of the tooth extends above and in front of the tooth-bar, to which it is attached, the working point falling back of and below the horizontal plane of the bar, giving a large opening or clearance, and terminates in a reverse slotted curve on the upper side of the beam and is so attached to the bar that it can be adjusted in the direction of its length and secured to the bar when so adjusted.

Variations in form and location as to the tooth-securing clip will readily suggest themselves without departing from the spirit and scope of my invention.

The simplicity of the construction of this device, its durability and cheapness, the absence of sled-runner attachment and hinge in center to catch trash, among other advantageous features, render this harrow a great improvement.

It is evident that various slight changes might be made in the forms, constructions, and arrangements of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. A harrow having vertically-movable bearings, turnable tooth-beams therein, and shoes attached to said bearings, substantially as described.

2. A harrow provided with tooth-beams mounted in bearings, each bearing provided with a single downwardly and rearwardly extending shoe secured thereto, each beam having such bearings at both ends, substantially as described.

3. A harrow having independently vertically movable tooth-beams so connected together as to be rocked simultaneously to raise or lower the teeth, yet so as to permit the independent vertical play of each beam, each beam provided with its own supporting-shoes, substantially as described.

4. In a harrow the combination of frame-bars, a tooth-beam carrying teeth, connections or bearings receiving the tooth-beam and confining or connecting the same to the frame-bars, and depending shoes secured to the front portions of said bearings or connections, substantially as described.

5. A tooth-beam, in combination with a curved harrow-tooth so formed for attachment to the beam that the working point of the tooth is raised or lowered by moving the tooth transversely of the beam and longitudinally of itself, said tooth having a longitudinal slot at the butt of the tooth opposite the beam, a washer or clip conforming to and bearing against said tooth at said slotted portion and provided with a holding teat or projection entering the tooth, and a clamping-bolt passing through said parts and the slot of the tooth and provided with a nut, whereby on loosening the nut the tooth and the washer can be shifted independently of the beam to vary the vertical position of the working point of the tooth.

6. A float-harrow having rigid frame-bars, turnable tooth-beams carrying teeth and provided with controlling and operating means, each tooth-beam so connected to the frame-bars as to be movable vertically independently thereof and of the remaining tooth-beams, whereby the individual tooth-beams float independently, each beam provided with its own supporting-shoes, substantially as described.

7. A tooth-beam, in combination with a curved tooth so formed for attachment that the point of the tooth is raised or lowered by moving the tooth transversely of the beam and longitudinally of itself, said tooth having a longitudinal slot opposite the beam, a reversible tooth-clamping means entering said slot and so arranged that on reversal of the means the tooth must be moved longitudinally to vary the working position of its point, substantially as described.

8. In a harrow, the combination of the rigid frame-bars, independently vertically movable bearings loosely confined to the frame-bars, the several turnable tooth-bars carrying curved teeth, each mounted to turn in and move vertically with its bearings, the adjusting-bar arranged above and so connected with all the tooth-bars as to rock the same simultaneously, and yet so as to permit independent vertical movement of any tooth-bar with its bearings, and operating means for the adjusting-bar, substantially as described.

9. In a harrow, the combination of a frame-bar, a bearing carried thereby, a shoe having the upwardly-extending end secured to the front side of said bearing, the shoe from thence extending downwardly and rearwardly beneath the bearing with its upper face adjacent to the under side of the bearing, and a tooth-beam in the bearing, substantially as described.

10. The combination with a harrow frame-bar, of a bearing having a forward projection, a supporting-shoe having its upper portion formed to receive and be locked on said projection, the free end of the shoe extending downwardly and rearwardly therefrom, and a turnable tooth-beam in the bearing, substantially as described.

11. In combination, frame-bars, carriers or supports, tooth-beams carrying teeth and mounted in the supports, and supporting-shoes, each having its upper end secured to a support in advance of the beam with its free end extending downwardly and rearwardly beneath the beam and so arranged that the upward spring of the free end of the shoe is limited by the lower end of the support, substantially as described.

12. In a float-harrow, the combination of frame-bars, a series of tooth-beams carrying teeth and connected with the frame-bars, and a series of downwardly and rearwardly extending tooth-beam-supporting shoes, each tooth-beam directly carried by its own supporting-shoes arranged beneath the same, substantially as described.

13. In a float-harrow, the combination of rigid frame-bars, several vertically-movable tooth-beams carrying teeth and each provided with its own supporting-shoes extending downwardly and rearwardly and moving vertically with the beam and loosely connected with the frame-bars, substantially as described.

14. In a float-harrow, the combination with rigid frame-bars, a series of independent tooth-beams carrying teeth and arranged beneath the frame-bars, and a series of downwardly and rearwardly extending short shoes arranged beneath the tooth-beams and frame-bars and loosely connected with the frame-bars, each beam provided with a pair of said shoes arranged beneath its end portions and connected thereto, substantially as described.

In testimony that I claim the foregoing as my own I affix my signature in presence of two witnesses.

EFFINGER E. WHIPPLE.

Witnesses:
G. M. PETRIE,
G. N. RICHARDSON.